Sept. 7, 1943.    C. W. LANPHERE    2,328,813
AUTOMATIC TRANSMISSION
Filed March 11, 1942    3 Sheets-Sheet 1
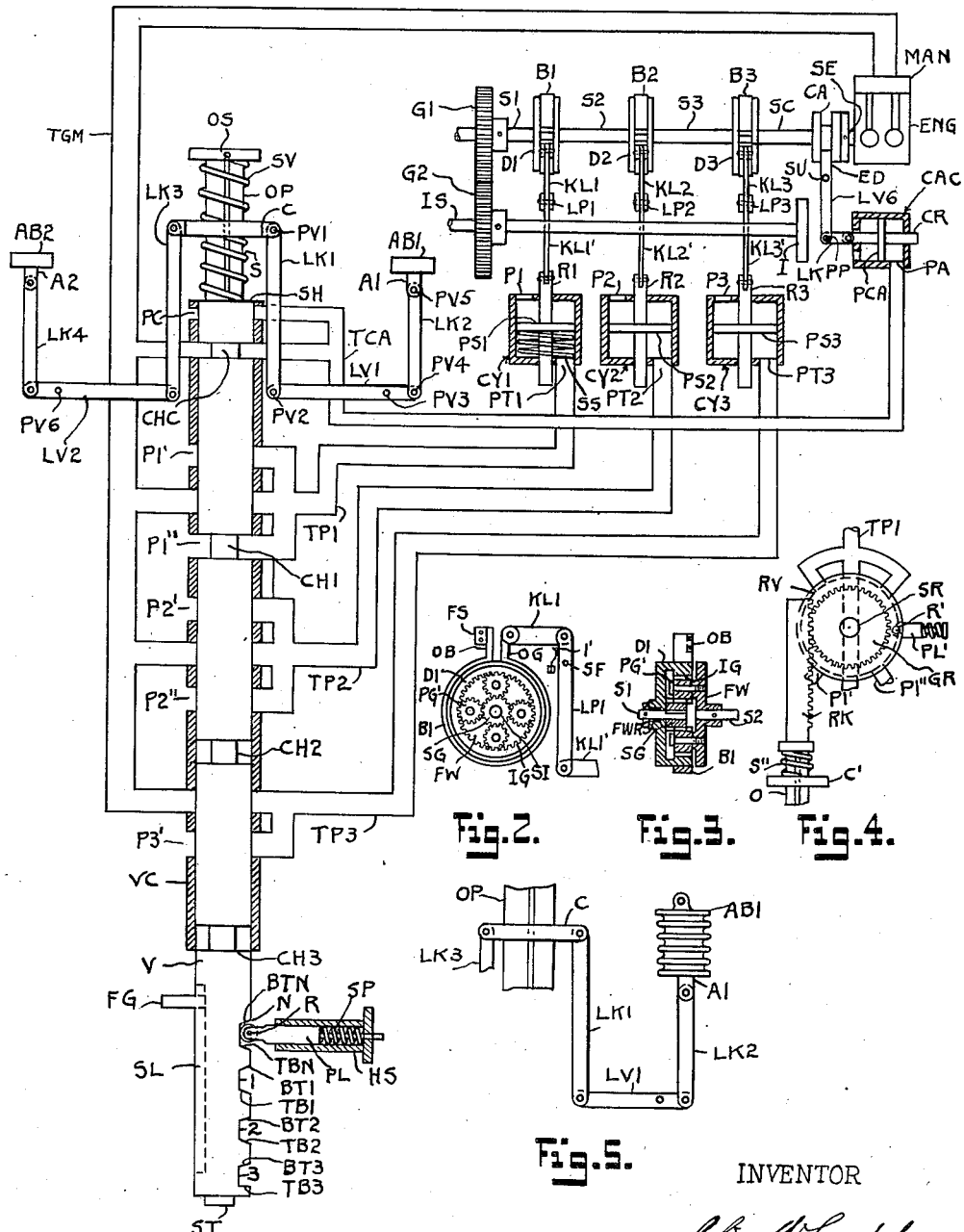
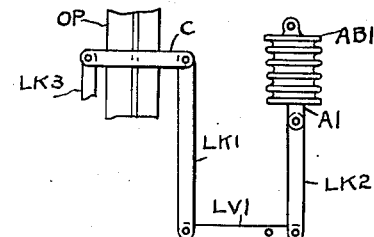
INVENTOR
Clive W. Lanphere.

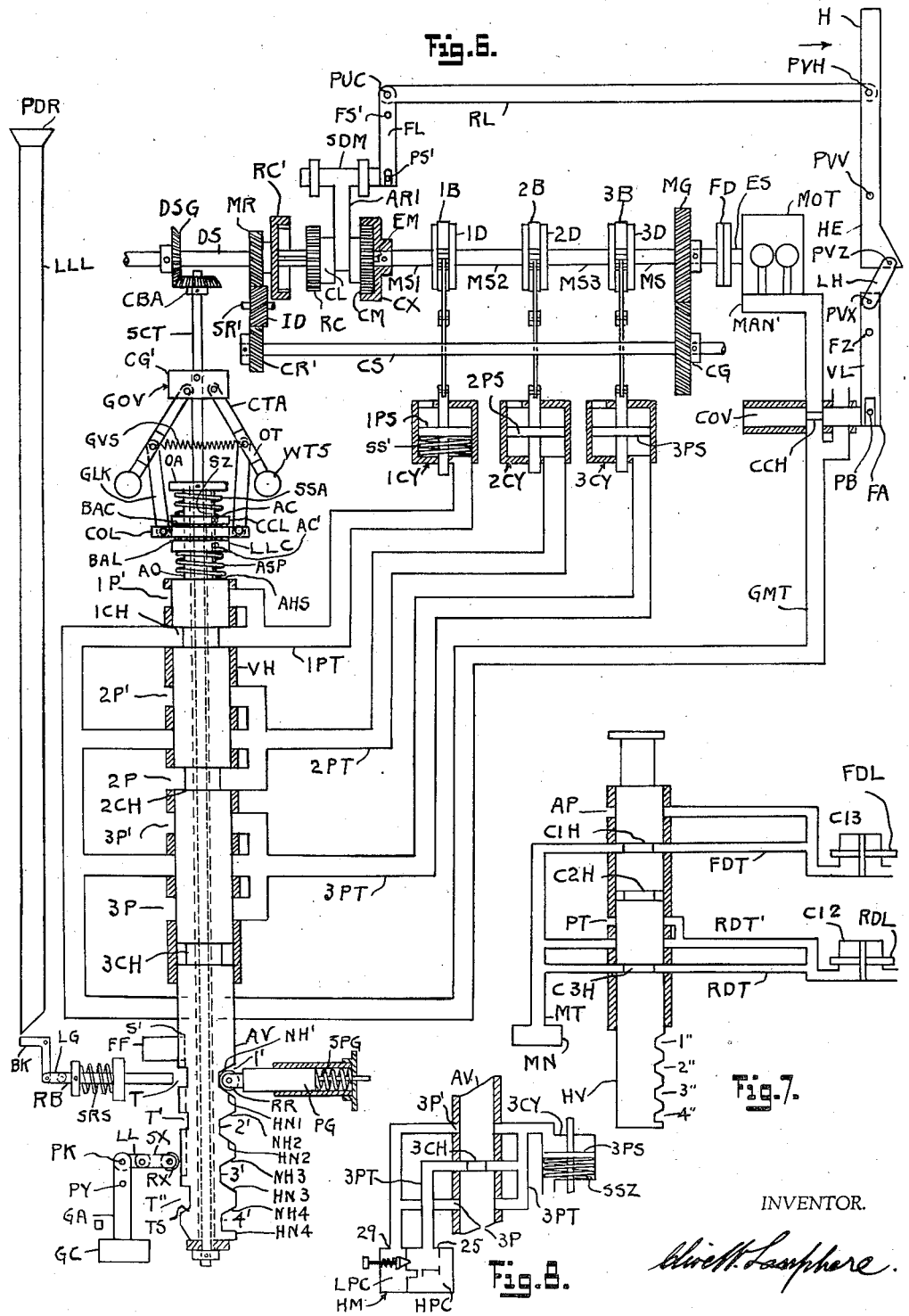

Sept. 7, 1943.  C. W. LANPHERE  2,328,813
AUTOMATIC TRANSMISSION
Filed March 11, 1942  3 Sheets-Sheet 3

INVENTOR.
Clive W. Lanphere.

Patented Sept. 7, 1943

2,328,813

UNITED STATES PATENT OFFICE 2,328,813

AUTOMATIC TRANSMISSION

Clive W. Lanphere, New York, N. Y.

Application March 11, 1942, Serial No. 434,234

25 Claims. (Cl. 74—269)

The present invention relates to a speed controlled speed changing planetary transmission, and particularly to airplane supercharger transmissions in which barometric means are utilized, the variations of which depend on variations in altitude, the latter variations being controlled by movement, i. e., speed of an airplane.

One object of my invention is to provide means for automatically changing the speed of an engine supercharger impeller, thus obviating the necessity of manual actuation.

Another object is to provide a plurality of plentary gear units thereby affording smoother operation than possible with slidable meshing elements.

A further object is to provide a plurality of fluid means for actuating the planetary units, the fluid means being pneumatic.

A still further object is to provide suitable valvular means for controlling the plurality of fluid means.

Another object is to provide means responsive to atmospheric pressure for actuating the valvular means.

These and other features will be more fully understood by reference to the drawings in which:

Figure 1 is a diagrammatic plan of the transmission with some of the elements sectioned.

Figure 2 is a diagrammatic elevation of a planetary gear unit and some of its actuating mechanism.

Figure 3 is a diagrammatic center cross section of a planetary gear unit.

Figure 4 is a diagrammatic view of a rack operated rotary valve.

Figure 5 is a diagrammatic view of barometric actuating mechanism.

Figure 6 is a diagrammatic plan of a modification of the invention.

Figure 7 is a diagrammatic view of a valve for actuating the drums forming parts of a transmission known in the art but of different structure than those shown in the present disclosure.

Figure 8 is a diagrammatic view of hydraulic means for actuating the fluid motors of this invention.

Figure 9:
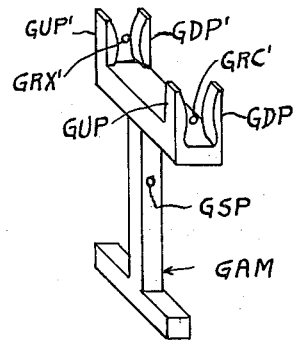
Figure 9 is an isometric view of gradient actuating means.

Two pressure responsive members AB1 and AB2 are shown in this disclosure but the number can be varied as desired. In Figures 1 and 5 of the present disclosure each of the arms A1 and A2 corresponds to the arm connected to and moved by an aneroid barometer.

Bearings, supports, connections, and all the parts comprising this invention can conform to known principles of construction. Three gear speeds are shown but the number can be varied.

The reference characters ENG identify a gasoline engine and MAN the engine intake manifold. The engine shaft is marked SE. A clutch CA of any suitable design may be provided for connecting shaft SE with a clutch shaft SC. Three planetary gear units may be utilized. Their drums also termed orbit gears are indicated by characters D1, D2, and D3. Figures 2 and 3 disclose one of these gear units, but any suitable type may be used with the control mechanism of this invention as Figs. 1, 2, 3, 6, and 10 are only diagrammatic and not intended to imply that the use of this control is restricted to only one type of planetary mechanism. Where similar parts are shown in Figures 1, 2, 3 and 5 the reference characters are similar. The unit for first speed comprises a sun gear identified by characters SG, four planetary gears by PG' and a drum internal orbit gear by IG. The hub of gear IG can be provided with over-running clutches of a type old in the art. This type comprises a pocket containing a roller FWR. The pocket is formed by a recess in the hub of gear IG and by the circumferential surface of a shaft S1. The bottom of the recess diverges from the shaft. The planetary gears can be pivotally mounted on a disc shaped carrier member FW which is secured to shaft S2. A band B1 encircles the drum D1. This band may be provided with an offset OB that can be suitably attached to a fixed support FS. Another offset OG on this band may be pivotally connected to a link KL1, and this link can be pivotally connected to a lever LP1. Lever LP1 can be pivotally mounted on a fixed support SF. A link KL1' (shown broken away) in Figure 2 may connect lever LP1 with a piston rod R1 of a fluid motor CY1. A band B2 may be provided for cooperation with drum D2. A third band B3 can similarly cooperate with drum D3. The main shaft has several sections in addition to shafts SE and SC. These sections are identified by characters S1, S2, and S3. Should the engine exhaust be used as an actuating means the shaft SE could be connected to the means actuated by the exhaust.

Figure 10:
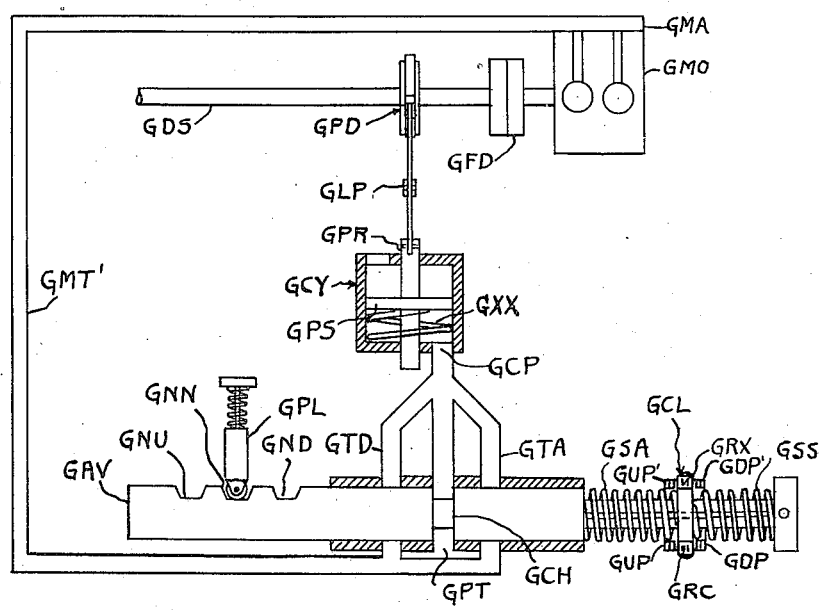
Figure 10 is a diagrammatic view of a modification of valve V shown in Figure 1, and cooperating mechanism.

When a clutch CA to be described shortly is in engaged position and all the bands B1, B2, and B3 are not binding on the drums a direct connection between the engine and shaft S1 results as each drum orbit gear revolves with its respective cooperating planetary gear unit which causes the narrow portion of the hub pocket to impinge on the roller which in turn binds on shaft S1 locking it to the orbit gear causing the shaft to rotate with it. When the band B1 binds sufficiently on the drum D1 the planetary members travel around the inside of the internal gear and the sun gear SG and shaft S2 drive shaft S1 in accordance with the teeth ratios of the gear members. At this time the orbit gear is at rest and the roller is in the wide portion of the pocket which frees the orbit gear from the shaft. For some speeds it may be desirable to have the sun gear SG drive the planetary members PG' instead of having the movements just above described. In this case the sun gear would be on shaft S2 and the disc FW with its planetary gears on shaft S1. As all the planetary units shown in Figs. 1, 6, and 10 are similar and function in the same manner as the first speed unit above described, functional details will not be given in describing the operation of the other units.

A gear G1 may be rigidly secured to shaft S1. Meshing with this gear may be a gear G2 rigidly attached to a shaft IS. The shaft IS can carry a supercharger impeller I of any suitable type.

Connected to the engine manifold MAN is a tube or conduit TGM having branches TCA, TP1, TP2, and TP3 which respectively cooperate with encircling channels CHC, CH1, CH2, and CH3 in a cylindrical valve V. This valve can be disposed in a horizontal position to afford easier movement. These tubes in the order listed can be connected to any suitable type of fluid motors CAC, CY1, CY2, and CY3.

Valve V may be enclosed in a casing VC. This valve may be provided with notches N, 1, 2, and 3 for cooperation with a plunger PL. This plunger can carry a roller R suitably supported for engaging these notches and a spring SP may be employed for urging this plunger towards them. A housing HS can be provided for enclosing this plunger and spring. Valve V may be provided with an offset portion OP, and a slot SL. A finger or guide FG suitably supported can be used for permanently engaging this slot, thus preventing rotation of valve V. A collar C may be keyed on offset OP between springs S and SV. One end of spring SV is supported by an offset OS on valve V and one end of spring S is supported by shoulder SH on this valve. A link LK1 can be pivoted at PV1 on collar C and at PV2 on lever LV1, and this lever may be suitably pivoted at PV3 on a fixed support (support not shown). Lever LV1 can be pivotally connected at PV4 with link LK2 and this link pivotally connected at PV5 with arm A1 which is attached to barometer AB1. A link LK3 similar to link LK1 may be provided for connecting collar C with lever LV2. This lever is similar to lever LV1. Link LK4 can be pivotally connected to lever LV2, and to arm A2 of barometer AB2.

The device functions as follows: With an airplane at sea level and the engine functioning, valve V is at the position shown in Figure 1. Its channel CHC is in line with tube TCA, affording a functional connection between the manifold MAN and the fluid motor CAC. Air is therefore drawn from motor CAC actuating its piston PCA towards port PA which by means of a link LK pivoted at PP on a lever LV5 swings this lever on a fixed support indicated at SU. Lever LV5 at its end ED can be suitably connected to the clutch CA and the movement of this lever actuates the clutch to disengaged position thereby freeing shaft SE from shaft SC. This prevents actuation of the impeller I at this time.

*Neutral to first speed change*

As the plan ascends the decrease in atmospheric pressure causes the barometric means to expand and actuate levers LV1 clockwise and LV2 counterclockwise. These levers by means of links LK1 and LK3 respectively urge collar C towards spring SV compressing it against offset OS. This tends to move valve V in the direction of this urge but the spring pressed plunger PL by means of its roller R checks its movement. By properly sloping the side TBN of notch N in valve V this plunger will be forced out of this notch at the desired predetermined altitude. This releases valve V and the compression in spring SV urges it to a position allowing plunger PL to enter notch 1. In entering this notch its roller R rides on the side BT1 of notch 1 thus giving an additional urge to valve V assuring its proper movement to first gear position. At this position the channel CHC is in line with port PC open to the atmosphere affording the ingress of atmosphere to tube TCA and cylinder CAC. This releases piston PCA, piston rod CR, link LK and lever LV6, whereupon the clutch CA urged by its spring means becomes engaging tying together shafts SC and SE. This actuates the entire shaft mechanism and rotates gear G1 which rotates gear G2 therewith rotating shaft IS and impeller I. With the alignment of channel CHC with port PC channel CH1 lines up with tube TP1 thus affording the suction of air from the fluid motor CY1 while atmosphere enters it through port P1. This actuates piston PS1 and piston rod R1 towards port PT1 and with them link KL1'. This link swings lever LP1 and this lever actuates link KL1 thereby actuating band B1 which binds on and checks the rotation of drum D1. The planetary unit inside this drum cooperates with shafts S1 and S2 and their rotation causes the impeller to function at first speed. When valve V moves to the position above described its channel CH2 becomes aligned with port P2'' but at this time actuates nothing. Channel CH3 moves to a position half way between its position shown in Figure 1 and a port P3', but nothing is actuated by its movement.

*First to second speed change*

As the plane ascends still further the barometric means again compress spring SV and by properly proportioning the side TB1 of notch 1 the roller R and plunger PL are forced out of this notch at the desired predetermined altitude. Valve V then moves to second speed position under the urge of spring SV and plunger PL as it impinges on the side BT2 of notch 2. At this position channel CH1 is in line with port P1' whereupon atmosphere enters tube TP1 and cylinder CY1 thus releasing piston PS1 and rod R1 and linkage and the band B1 allowing a spring 1' to actuate lever LP1 thus releasing the drum D1. This sets up a direct connection between shafts S1 and S2. When channel CH1 lines up with port P1' the channel CHC simply moves further but actuates nothing. Channel CH2 lines up with tube TP2 and air is drawn from cylinder (fluid motor) CY2. Its piston PS2 moves towards port PT2 and with it piston rod R2 while atmosphere enters port P2. This actuates link KL2', lever PL2, link KL2 and band B2 causing it to bind on drum D2 whereupon the planetary gears inside function and drive the shafts S2 and S1 and therewith shaft IS and impeller I in second speed. Channel CH3 moves to port P3', but does not actuate anything at this time.

Second to third speed change

As the plane ascends still higher the barometric means and collar C compress spring SV and by correctly proportioning the side TB2 of notch 2, the roller R and plunger PL are forced out of this notch at the desired predetermined altitude, thus releasing valve V whereupon the spring SV and roller R impinging on the side BT3 of notch 3 carry this valve to third speed position. Channel CHC moves to a point further from port PC but actuates nothing. Channel CH1 moves to a point beyond port P1' but does not actuate anything. Channel CH2 moves to port P2' allowing atmosphere to enter cylinder (fluid motor) CY2 through tube TP2. This releases piston PS2, link KL2', lever LP2, link KL2, and band B2 whereupon the spring (spring not shown here) similar to spring I' for lever LP1 actuates lever LP2 freeing drum D2 by loosening band B2 from it resulting in a direct connection or direct drive between shafts S2 and S3. In the valve movement now being described channel CH3 lines up with tube TP3 resulting in the suction of air from cylinder CY3 also referred to as a fluid motor. Piston PS3 and rod R3 are drawn towards port PT3 causing link KL3', lever LP3, and link KL3 to actuate band B3 causing it to bind on drum D3 thereby actuating the gears within this drum in third speed in proportion to the gear ratios deemed suitable. Shafts S3, S2, and S1 then drive the impeller shaft IS and impeller in third speed.

Third to second speed change

With the transmission operating in third speed, the descent of the plane to an altitude somewhat lower than that at which the change from second to third speed occurs causes the barometric means to urge collar C in opposition to spring S. By properly sloping the side BT3 of notch 3 roller R and plunger PL will be forced out of this notch at the altitude above mentioned. Valve V by the combined action of spring S and plunger PL as its roller R rides on the side TB2 of notch 2 moves to second speed position where this plunger holds it. At this position channel CH3 is in alignment with port P3' affording the ingress of atmosphere to tube TP3 and cylinder CY3. This releases piston PS3 and its linkage to band B3 and therewith the drum D3 as the spring cooperating with lever LP3 (spring not shown) actuates this lever releasing this drum. In cylinder CY1 is indicated a spring SS for actuating piston PS1 towards port P1. This spring can supplement spring I' in actuating the release of band B1. Similar springs (not shown) can be used in cylinders CY2 and CY3. With valve V at second speed position, the transmission functions in second speed as already described, the gear unit in drum D3 forming a direct connection between shafts SC and S3, and channel CH2 being in line with tube TP2 having moved there from its alignment with port P2'. Channel CH1 has moved from a point beyond port P1' to this port; and channel CHC has moved towards port PC but not to it.

Second to first speed change

As the plane further descends the barometric means actuate collar C towards spring S and at an altitude less than that at which the change from first to second speed occurs, by properly designing side BT2 of notch 2 the plunger PL and roller R are moved out of this notch, releasing valve V which moves to a position allowing roller R to impinge on the side TB1 of notch 1 to supplement spring S in actuating this valve to first speed position. In this movement channel CH2 moves from tube TP2 to port P2" allowing atmosphere to enter tube TP2 and cylinder CY2. This releases piston PS2 and its linkage and therewith drum D2 as previously described. A direct connection is set up between shafts S3 and S2. Channel CH1 is in line with tube TP1 and the gear unit in drum D1 drives the transmission shafts and the impeller in first speed. Channel CH3 moves from port P3' towards plunger PL; and channel CHC moves to port PC.

First to neutral change

As the plane still further descends the barometric means actuate collar C in opposition to spring S and by suitably designing the side BT1 of notch 1 roller R and plunger PL leave this notch at an altitude lower than that at which the neutral to first speed change occurs. Valve V urged by spring S and roller R impinging on the side TBN of notch N in valve V moves to a position aligning channel CH1 with port P1" which allows atmosphere to enter tube TP1 and cylinder CY1. This releases the piston PS1 and cooperating linkage to band B1 which releases the drum D1 resulting in a direct connection between shafts S2 and S1. Channel CHC is in alignment with tube TCA which affords a connection between the manifold and cylinder CAC and air is drawn from this cylinder which pulls piston PCA towards port PA and by means of the link LK swings the lever LV6 thereby disengaging the clutch CA. This disconnects shaft SC with shaft SE and prevents actuation of the impeller at lower altitudes. Channel CH2 is at the position shown in Figure 1, and channel CH3 has moved further towards plunger PL.

Figure 4 discloses an end view of a rotary valve RV secured to a shaft SR. This valve could be used as a substitute for valve V. One tube and set of ports are indicated which could be tube TP1 and ports P1' and P1". To accommodate all the tubes and ports, etc., this valve would have to be long enough and large enough in diameter. A rack RK can be provided to cooperate with a gear GR. This gear can be suitably attached to shaft SR. A portion of the rack can be provided with an offset O for carrying two springs similar to the springs S and SV on valve V. One of these springs S" and a collar C' are shown but the other spring is not, as offset O is shown broken away.

General notes

To assure proper functioning of the fluid motors at the higher altitudes they can be of different diameters as the atmospheric pressure requires.

The levers LV1 and LV2 in order to actuate the collar C and valve V the necessary distances, can be proportioned as needed to assure these movements when the barometric means function in accordance with the various altitudes.

Only one plunger PL is shown but obviously more can be added.

In Figure 6 is shown a modification of the device above described, making it adaptable to an automobile transmission.

A gasoline motor is indicated by reference characters MOT, and its intake manifold by characters MAN'. The motor shaft is designated by symbols ES and a main shaft by characters MS. A device FD known in the art as an hydraulic coupling can be provided for connecting shafts ES and MS in the usual manner. A gear MG can be rigidly attached to shaft MS. A gear CG meshing with gear MG is immovably secured to a shaft CS. Shaft CS may be provided with another gear CR' rigidly attached to it. Gear CR' meshes with a gear ID loosely mounted and rotatable on a shaft SR'. Gear ID meshes with a gear MR rotatably mounted on a shaft DS. One end EM of shaft DS may be disposed in a recess in shaft MSI. The latter shaft can be connected to a shaft MS2 by a planetary gear unit (unit not shown here) contained in a drum ID. Shaft MS2 may be connected with a shaft MS3 by means of a planetary unit (unit not shown) within a drum 2D. The shaft MS3 can be connected to the shaft MS by a third planetary unit (unit not shown) inside a drum 3D.

A sliding clutch unit CL splined on shaft DS may be used for connecting shafts DS and MSI and tying gear MR to shaft DS. This clutch unit may have a toothed member RC of any suitable type adapted to engage a cooperating member RC' on gear MR, and another toothed member CM for engaging a suitable member CX that is immovably attached to shaft MSI. A yoke ARI can be provided for connecting unit CL with a sliding rail SDM. This unit is rotatable in the yoke. On this rail is a post PS'. A lever FL may be provided having a forked end that straddles this post. This lever may be pivotally mounted on a fixed support FS', and pivotally connected at PUC to a link RL. This link can be pivotally connected at PVH to a handle H, and this handle may be pivotally mounted on a fixed support PVV. The end HE of handle H may be provided with a pivotal connection PVZ to a link LH. This link can have a pivotal connection PVX with a lever VL, and lever VL may be pivotally mounted on a fixed support FZ. This lever may have a forked end FA for straddling a post PB carried on a valve COV. The valve COV may be provided with a channel CCH. This valve opens and blocks a tube GMT which forms a connection between the manifold and several fluid motors, i. e., pneumatic cylinders. The purpose of the elements described in this paragraph will now be explained.

With the elements in the positions shown in Figure 6 vacuum is applied to a tube IPT similarly to its application to tube TPI in the supercharger transmission. More details relevant to this will be given at the proper place. The clutch unit CL is free from the reverse gear meshing element RC' and in this position is tying shafts DS and MSI together, as members CM and CX are in mesh. With the motor MOT functioning speed changes are actuated when channels in a valve AV are in alignment with their respective cooperating tubes. When the handle H is moved in the direction indicated by the arrow to its neutral position, the valve COV moves in the same direction blocking tube GMT, and the unit CL moves to a position freeing members CM and CX from each other, thus disconnecting shafts MSI and DS, which prevents the motor MOT actuating shaft DS. Continued movement of handle H actuates the clutch CL to a position meshing members RC and RC', thus setting the transmission in reverse gear. When the motor is speeded up the shaft DS functions in reverse and should the centrifugal means (to be described shortly) actuate valve AV no actuation of the cylinders ICY, 2CY and 3CY occurs as tube GMT is blocked at valve COV. If valve COV is dispensed with no interference with the operation of reverse gear can occur but the planetary units might be actuated. However this does no harm as shafts MSI and DS are disconnected. Gear MR is actuated through gears ID, CR', shaft CS, and gears CG and MG. Moving handle H oppositely to the direction indicated by the arrow first returns the transmission to neutral and next to a position tying shafts DS and MSI together. Valve COV becomes aligned at its channel CCH with tube GMT. The device is now in position to function in forward speeds in accordance with the speed of the car. Tube GMT branches into three portions. These are identified by reference characters IPT, 2PT, and 3PT. Tube IPT in cooperation with a channel ICH in valve AV connects the manifold MAN' with the fluid motor ICY. Tube 2PT in cooperation with a channel 2CH connects the manifold with cylinder 2CY, and tube 3PT connects the manifold with cylinder 3CY by means of channel 3CH.

Valve AV may be provided with notches or recesses I', 2', 3' and 4'. A plunger PG actuated by a spring SPG with a roller RR suitably carried by this plunger may be provided for engaging these notches. Valve AV can be enclosed in a casing VH. This valve may be provided with a slot S' in which a fixed finger FF is disposed, thus preventing rotation of said valve. This valve can have an offset AO terminating in another offset OA, and on offset AO may be a collar COL adapted to rotate and move longitudinally on it. A pair of collars, one on each side of collar COL may be provided. They are identified by characters CCL and LLC. These collars are prevented from rotating by keys AC and AC' which extend from collars CCL and LLC respectively, and which slide in a keyway SZ in valve AV. Ball bearings BAC are suitably mounted between collars COL and CCL; and similar bearings BAL may be disposed between collars COL and LLC. A spring SSA can be located on offset AO between offset OA and collar CCL. Another spring ASP may be disposed on offset AO between collar LLC and a shoulder AHS on valve AV.

A centrifugal device or governor may be provided for actuating valve AV in two directions. This governor may have arms CTA which can be pivoted on a collar CG' secured to a shaft SCT which rotates. These arms may be provided with weights WTS. A pair of springs GVS (only one spring shown) may be connected to offsets OT on arms CTA. A clearance between this shaft and valve AV may be provided to permit rotation of the shaft without bearing on the valve. Links GLK are pivotally connected to arms CTA and collar COL. A beveled gear CBA is rigidly mounted on shaft SCT and meshing with this gear is another beveled gear DSG immovably attached to shaft DS. The rotation of shaft DS rotates shaft SCT.

With the motor functioning and valve AV at the position shown in Figure 6 channel ICH is in line with tube IPT affording the appilcation of vacuum to cylinder ICY. Its piston IPS and linkage similar to that cooperating with cylinder CYI in the supercharger device actuate a band IB causing the drum ID and contained planetary gears to function in first speed when the motor shaft ES rotates the hydraulic coupling unit FD rapidly enough to actuate shafts MS, MS3, and MS2. The gears in drum ID drive shafts MSI and DS.

First to second speed change

With the car moving in first speed and as the speed increases the arms CTA swing away from shaft SCT thereby pulling links GLK and collar COL. This compresses the spring SSA but valve AV does not move immediately because of the engagement of roller RR on plunger PG in notch I'. By properly designing the governor, the spring SSA, and the side HNI of this notch, plunger PG is forced out of it at the desired predetermined speed. Valve AV then moves towards the centrifugal means sufficiently to align notch 2' with this plunger, whereupon its roller RR impinges on the side NH2 of notch 2' which urges valve AV to its second speed position where the plunger locks it. The compression of spring SSA and the urge of plunger PG assure a complete movement of this valve even though the car lag slows down the governor. At second speed position the channel ICH is in line with a port IP' affording the ingress of atmosphere to cylinder ICY. This releases piston IPS and its linkage, also the band IB and therewith orbit drum ID, which sets up a direct drive connection between shafts MS2 and MSI. Channel 2CH is in line with tube 2PT and suction occurs from cylinder 2CY, thereby actuating piston 2PS and cooperating elements whereupon the planetary gear unit for second speed functions and the shaft DS operates at second speed. Channel 3CH is in line with a port 3P connecting cylinder 3CY with the atmosphere but piston 3PS is at released position so no actuation occurs.

Second to third speed change

As the car speed increases, the governor again compresses the spring SSA through collar COL and by properly designing the side HN2 of notch 2', plunger PG is forced out of it at the desired predetermined speed. Spring SSA and roller RR impinging on the side NH3 of notch 3' carry valve AV to third speed position. In this movement channel 2CH moves from its alignment with tube 2PT to port 2P' which permits atmosphere to enter this tube and cylinder 2CY. Piston 2PS is released and with it the linkage to band 2B thus releasing drum 2D resulting in a direct connection between shafts MS3 and MS2. Channel 3CH moves from port 3P to tube 3PT. Suction from cylinder 3CY occurs actuating its piston 3PS and therewith its linkage and band 3B whereupon the planetary gears inside drum 3D function in third speed, driving the chain of shafts including shaft DS in third speed. Channel ICH moves from port IP' to a point beyond this port.

Third to fourth speed change

Further increase in car speed causes the centrifugal means to again compress spring SSA. By correctly designing the side HN3 of notch 3', plunger PG is lifted out of this notch at another predetermined speed and then rides on the side NH4 of notch 4', coming to rest in this notch. At fourth speed position channel 3CH of valve AV is in line with port 3P' and atmosphere enters tube 3PT releasing piston 3PS and linkage and band 3B freeing drum 3D with the planetary gears in it setting up a direct connection between shafts MS3 and MS which drives the car in fourth speed. Channel 2CH is midway between port 2P' and tube 2PT. Channel ICH is at a point still further from port IP'. In fourth speed all shafts form a direct drive.

Fourth to third speed change

With the transmission in fourth speed and the car speed decreasing, arms CTA swing towards shaft SCT. This urges collar COL in opposition to spring ASP comprising it which tends to move valve AV regressively. By properly designing the side NH4 of notch 4' plunger PG is pushed out of this notch at a predetermined car speed. Valve AV moves to a position permitting this plunger and its roller RR to enter notch 3' and roll on the side HN3 of this notch with this valve coming to rest at third speed position. In this movement channel 3CH moves from port 3P' to tube 3PT allowing suction from cylinder 3CY to occur which actuates the third speed planetary gears similarly to their actuation described in the change from second to third speed. The drive shaft DS then functions in third speed. Channel 2CH moves from its position beyond port 2P' to a position of alignment with this port, and channel ICH moves towards port IP' but not to it.

Third to second speed change

As the car still further decreases its speed collar COL again compresses spring ASP tending to urge valve AV towards second speed position. By correctly designing notch 3' plunger PG is pushed out of this notch at the desired predetermined car speed and enters notch 2' with valve AV stopping at second speed position. Valve channel 3CH moves from tube 3PT to port 3P allowing atmosphere to enter this tube and cylinder 3CY. Piston 3PS is released and therewith its cooperating linkage and band 3B whereupon the gears in drum 3D set up a direct connection between shafts MS3 and MS. Channel 2CH moves from port 2P' to tube 2PT and the transmission operates in second speed as described in description of the first to second speed change. Channel ICH moves into alignment with port IP'.

Second to first speed change

Further reduction of the car speed results in the compression of spring ASP. By suitably forming the side NH2 of notch 2' plunger PG and roller RR are forced out of this notch at the desired predetermined car speed. Valve AV moves to a position affording the impingement of roller RR on the side HNI of notch I' which urges this valve to first speed position where the plunger PG locks it. Channel 2CH moves from tube 2PT to port 2P resulting in the ingress of atmosphere to tube 2PT and cylinder 2CY. This releases piston 2PS and its linkage and band 2B thus freeing drum 2D which sets up a direct connection between shafts MS2 and MS3. Channel ICH moves from port IP' to tube IPT affording the application of vacuum to tube IPT and cylinder ICY and therewith the actuation of the first speed elements as previously described. Channel 3CH moves from port 3P to the position shown in Figure 6.

Only one plunger PG is shown but of course more can be added.

A gradient control can be provided comprising an arm GA carrying a weight GC, and a link LL pivotally connected to this arm at PK and to a movable member SX, this member carrying a roller RX. Arm GA can be pivoted on a fixed support PY. When a car is ascending a grade, the arm GA swings on pivotal support PY thereby actuating roller RX towards valve AV. Notches similar to notch T'' having sloping sides like that indicated at TS may be provided in this valve. By designing this slope correctly roller RX will be forced out of the notch it may be in, on a grade of predetermined degree, thus assuring greater car speed than that required for actuating shifts under more favorable road conditions. On grades of lesser degree the shifts will occur at a speed corresponding with the degree. A similar control (not shown) to function when a car descends a grade may be positioned to engage one or more notches on the side of valve AV opposite to the side having the notches already described. These notches can be designed with straight sides instead of beveled ones. This design prevents any shift so controlled from taking place while the car is on a grade of predetermined degree.

Manual control

A pedal PDR placed near the driver's left foot can be provided with any suitable means for connecting it with a lock or holding bar RB. The connection means shown in Figure 6 may comprise a rod LLL, a bellcrank BK, and a link LG. When this pedal is depressed, bar RB moves in opposition to a spring SRS into engagement with any of the notches T, T', T'' in valve AV, that may be in alignment with it. Each notch corresponds with a speed position of this valve. When bar RB engages a notch the transmission speed corresponding with it is maintained. When it is released the spring SRS urges bar RB out of the notch.

Modified valve

The modification shown in Figure 7 discloses a valve adapted to actuate the two drums that form a part of a transmission, now in use in some cars. In Figure 7 these drums are not shown but the fluid motors and linkage for these drums are indicated.

The transmission functions in first speed when both the drums are held by their cooperating bands. It operates in second speed when only the front drum rotates and the rear drum does not. In third speed the front drum is held and the rear drum rotates; and in fourth speed both drums rotate.

The valve HV shown in Figure 7 can be actuated by means similar to that disclosed in the description of the valve AV. At first speed position a channel C1H is in line with a tube FDT and channel C3H is aligned with tube RDT. Channel C2H is positioned between tube FDT and a port PT. Vacuum is thus applied to tubes FDT and RDT and to fluid motors C13 and C12. Linkage FDL to the front drum and linkage RDL to the rear drum are actuated causing their respective bands to bind on them preventing their rotation. With the motor functioning the transmission operates in first speed.

First to second speed change

When valve HV moves to second speed position channel C1H moves from tube FDT to port AP and channel C3H moves from tube RDT to a tube RDT'. Atmosphere enters the fluid motor C13 and the front drum is released while vacuum is applied to tube RDT' and fluid motor C12 functions resulting in the holding of the rear drum. The device therefore operates in second speed. Channel C2H moves nearer to tube FDT, but not to it.

Second to third speed change

In the movement of valve HV from second to third speed position channel C3H moves from tube RDT' to port PT and channel C2H into alignment with tube FDT. Channel C1H moves away from port AP. Atmosphere enters fluid motor C12 releasing the rear drum, while vacuum actuates fluid motor C13, resulting in the stoppage of rotation of the front drum. Third speed then functions.

Third to fourth speed change

Valve HV moves from its third speed position to fourth speed position, and channel C2H moves from tube FDT to port AP releasing the front drum as described in the first to second speed change. Channel C3H moves from port PT to a point beyond it, and channel C1H moves still further from port AP. Both drums are now free and the transmission operates in fourth speed.

Fourth to third speed change

The regressive movement of valve HV is similar to that of valve AV. In its movement from fourth speed position to third speed position channel C2H moves from port AP to tube FDT and the front drum ceases to rotate. Channel C3H moves from a point beyond port PT to this port. Channel C1H moves towards port AP but not to it. The rear drum is free while the front drum is not. The transmission functions in third speed.

Third to second speed change

In the movement of valve HV from third to second speed position channel C1H moves from its position beyond port AP to this port, channel C2H moves from tube FDT towards port PT but not to it; and channel C3H moves from port PT to tube RDT'. Channel C1H at port AP releases the front drum; and channel C3H at tube RDT' prevents the rotation of the rear drum. The transmission operates in second speed.

Second to first speed change

When valve HV moves from second to first speed position channel C3H moves from tube RDT' to tube RDT; channel C1H moves from port AP to tube FDT; and channel C2H moves from its position to a position still further from tube FDT but not to port PT. With channel C3H in line with tube RDT and channel C1H in line with tube FDT, both drums are held against rotation and the transmission functions in first speed.

Alternative constructions

Instead of the hydraulic coupling FD shown in Figure 6, the clutch CA disclosed in Figure 1 could be substituted. When the transmission is in first speed and the car coming to a stop the driver would disengage the clutch by means of a pedal (not shown) in the usual manner thus disconnecting the motor from the chain of drive shafts; and at the same time actuate the handle H to neutral position thereby disconnecting shafts MS1 and DS through the means of clutch CL. The pedal could then be released and although the motor still functions it would not actuate the drive shafts. To start the car the pedal would again be actuated to disengage the clutch and the handle H actuated to first speed position whereupon the pedal would be released.

The means now to be described could be substituted for the centrifugal actuating means and cooperating mechanism shown in Figure 6. Figure 10 discloses a valve GAV that may be horizontally disposed having one encircling channel GCH and a collar GCL that may be provided with suitable arms on which rollers GRC and GRX can be rotatably mounted. This collar is movable on valve GAV as is collar C on valve V. A gradient pendulum GAM (see Figure 9) can be provided and may be pivotally mounted on a suitable fixed support GSP, this pendulum serving as an actuating means. Prongs GUP, GUP', GDP and GDP' are carried by it. The reference characters GRC' and GRX' indicate the approximate positions of the rollers GRC and GRX in relation to the pendulum when it is in neutral position, i. e., non-actuating position. For cooperation with these elements one fluid motor GCY and one planetary gear unit GPD may be used, and these can be connected by linkage GLP functionally attached to a piston rod GPR, this linkage being similar to the linkages already described relating to other fluid motors and planetary units. This affords a direct drive connection between an hydraulic coupling GFD and a drive shaft GDS when a car is on level or fairly level ground as the pendulum then does not actuate anything.

When the car ascends a grade the pendulum at its top swings to the right as viewed and its prongs GUP and GUP' impinge on rollers GRC and GRX respectively on collar GCL. This compresses a spring GSS tending to urge valve GAV to the right as viewed. A plunger GPL similar to plunger PG shown in Figure 6 prevents its movement until a grade of predetermined degree is reached whereupon the plunger GPL is forced out of a notch GNN releasing valve GAV which moves to a position aligning channel GCH with a tube GTA at which point the plunger locks this valve by entering a notch GNU. This tube is connected with a manifold of a gasoline engine by a tube GMT'. Characters GMA and GMO identify the manifold and engine respectively. Vacuum is applied to cylinder GCY and its piston GPS moves towards a port GCP and therewith its rod GPR. This actuates linkage GLP and the planetary gear unit GPD functions in a lower speed instead of a direct drive similarly to the functioning of gear units previously described in other parts of this specification.

When the car leaves the grade above mentioned the pendulum GAM swings oppositely to its movement above detailed and its prongs GDP and GDP' impinge on rollers GRC and GRX compressing a spring GSA. Plunger GPL is pushed out of notch GNU and valve GAV moves to its neutral position with this plunger locking it by entering notch GNN. In this position channel GCH is in alignment with port GPT and atmosphere enters the fluid motor GCY, releasing piston GPS and linkage GLP permitting the planetary gear unit to set up a direct drive connection.

When the car descends a grade the top of the pendulum swings to the left as viewed and its prongs GDP and GDP' urge collar GCL as described in the paragraph just above and similarly compress spring GSA. On a grade of predetermined degree plunger GPL is forced out of notch GNN and valve GAV moves to a position aligning its channel GCH with a tube GTD at which position plunger GPL enters a notch GND and locks the valve. With this alignment air is drawn from fluid motor GCY and the speed changing elements function as described in the movement of valve GAV to a position aligning channel GCH with tube GTA.

When the car leaves this declivity the pendulum at its top swings to the right and the valve GAV urged by collar GCL moves similarly to the movement detailed in the operation of this mechanism when the car ascends a grade. Plunger GPL leaves notch GND and enters notch GNN thereby locking the valve at this position. At this position channel GCH is in line with port GPT and atmosphere enters fluid motor GCY releasing the speed changing elements permitting the planetary unit to set up a direct drive connection between the hydraulic coupling GFD and the shaft GDS.

With this gradient actuated mechanism manual means similar to that disclosed in Figure 6 can be used for actuating shifts from forward speeds to neutral and reverse speed and vice versa.

This gradient mechanism affords a considerable range of operation with a minimum of structural elements.

In Figure 8 is disclosed a portion of valve AV showing one of its channels 3CH and cooperating hydraulic means for actuating cylinder 3CY. Obviously this hydraulic means can be applied to cylinders 2CY and ICY so this application will not be described here. Similar reference characters are used for similar parts in Figures 6 and 8.

An hydraulic pump of any suitable design may be used and one of these is indicated by reference characters HM. This pump can be similar to that shown in Patent #1,886,003. The tube or conduit 3PT of the present invention can be connected to the high pressure chamber HPC of said pump at the point of attachment of tube 25 shown in the above mentioned patent. In Figure 8 valve AV is shown in third speed position with channel 3CH in alignment with tube 3PT. With the pump functioning pressure is applied to piston 3PS which actuates its cooperating linkage and band 3B resulting in the gears in drum 3D functioning in third speed as previously described. See Figure 6 for all the elements just above mentioned. When valve AV moves into alignment with either port 3P or 3P' the fluid pressure on piston 3PS is blocked and spring SSZ in cylinder 3CY returns this piston to normal position which releases drum 3D in the manner already described. With the release of this drum either fourth or second speed would function as previously detailed. When piston 3PS returns to normal position the fluid in cylinder 3CY flows into the low pressure chamber LPC of the pump through a tube connected to the pump as is tube 29 in Patent 1,886,003.

From the foregoing it will be seen that while a preferred embodiment of this invention has been disclosed, it is not desired to restrict the details to the exact construction shown, it being obvious that changes not involving invention may be made without conflicting with the spirit of the invention and the scope of the claims.

What I claim is:

1. In a transmission, transmission mechanism, fluid means for controlling said mechanism, means for controlling said fluid means, said second mentioned means including in combination a single valvular means, a plurality of resilient means for actuating said valvular means in a plurality of directions, and means responsive to atmospheric pressure for actuating said plurality of resilient means.

2. In a speed changing mechanism, speed changing means, a plurality of fluid means for actuating said speed changing means, a single valvular means for controlling said plurality of fluid means, said fluid means including in combination a single tubular means, a plurality of ports controlled by said single valvular means for admitting fluid to said single tubular means for actuating said speed changing means, said single valvular means adapted to afford and to block the passage of fluid to said single tubular means through said plurality of ports, and means responsive to atmospheric pressure for actuating said single valvular means.

3. In a speed changing mechanism, speed changing means, fluid means for actuating said speed changing means, valvular means for controlling said fluid means, a tube having a plurality of sections cooperating with said valvular means, a plurality of ports connecting said tube with the atmosphere, said valvular means adapted to alternately connect said sections of said tube, and each of said plurality of ports with said tube and means responsive to atmospheric pressure for actuating said valvular means.

4. In a speed changing mechanism, speed changing means including in combination a single movable means, a plurality of resilient means disposed on said single movable means for actuating said single movable means in a plurality of directions, impelling means for impelling said plurality of resilient means, and linkage disposed on a plurality of sides of a line falling within the path of movement of said plurality of resilient means, said line corresponding with the direction of said movement, said linkage connected to and adapted to actuate said impelling means.

5. In a planetary speed changing mechanism, planetary speed changing means, control means for said planetary speed changing means, said control means including in combination a single movable means, a plurality of yielding means for actuating said single movable means in a plurality of directions, impelling means for impelling said plurality of yielding means in a plurality of directions, linkage connected to said impelling means for actuating said impelling means in a plurality of directions, said linkage disposed on a plurality of sides of said impelling means, and actuating means for said linkage.

6. In a planetary speed changing mechanism, planetary speed changing means, control means for said planetary speed changing means, said control means including in combination a single movable means, a plurality of yielding means for actuating said single movable means in a plurality of directions, impelling means for impelling said plurality of yielding means in a plurality of directions, linkage connected to said impelling means for actuating said impelling means in a plurality of directions, said linkage disposed on a plurality of sides of said movable means, and actuating means for said linkage.

7. In a speed changing mechanism, speed changing means, pivotal means for actuating said speed changing means, actuating means for said pivotal means, said actuating means including in combination movable means, a plurality of yielding means for actuating said movable means in a plurality of directions, impelling means for impelling said plurality of yielding means in a plurality of directions, linkage for actuating said impelling means in a plurality of directions, said linkage disposed on a plurality of sides of a line falling within the path of movement of said movable means, said line corresponding with the direction of said movement, and actuating means for said linkage.

8. In a control mechanism, control means including in combination a single movable means, a plurality of yielding means movable with said single movable means for actuating said single movable means in a plurality of directions, impelling means for impelling said plurality of yielding means in a plurality of directions, a plurality of links connected to said impelling means for actuating said impelling means in a plurality of directions, said plurality of links disposed on a plurality of sides of a line falling within the path of movement of said single movable means, said line corresponding with the direction of said movement, and actuating means for said plurality of links.

9. In an automatic planetary speed changing mechanism, a plurality of planetary speed changing means, said plurality of planetary speed changing means including in combination a plurality of carrier means and a plurality of planet gears thereon, and a plurality of orbit gears, holding means for each of said orbit gears, operating means for each of said holding means, and actuating means including sealed capsular means responsive to atmospheric pressure for actuating all of the operating means required to operate in functional sequence a plurality of said holding means.

10. A transmission mechanism including in combination a valve, actuating means for said valve, said actuating means including in combination operating means disposed on said valve for operating said valve in one direction, and operating means disposed on said valve for operating said valve in another direction, impelling means for impelling both of said operating means, and a plurality of link actuating means for and attached to said impelling means, said plurality of link actuating means disposed on a plurality of sides of a line falling within the path of movement of said impelling means, said line corresponding with the direction of said movement.

11. A speed changing mechanism including in combination a plurality of shafts, means including in combination planetary gear mechanism for connecting some of said shafts, a plurality of over-running clutch means cooperating with some of said shafts, said clutch means simultaneously permitting different speeds of some of said shafts, pivotal controlling means for said planetary gear mechanism, actuating means for said pivotal controlling means, said actuating means including in combination a single movable means, a plurality of yielding means for actuating said single movable means in a plurality of directions, impelling means for impelling said plurality of yielding means in a plurality of directions, and a plurality of pivotal means for actuating said impelling means.

12. In a planetary speed changing mechanism, driving means, driven means, planetary gear mechanism for connecting said driving means and said driven means, a free wheeling connection means between said planetary gear mechanism and said driven means to simultaneously permit different speeds of said driving means and said driven means, pivotal controlling means for said planetary gear mechanism, actuating means for said pivotal controlling means, said actuating means including in combination a single movable means, impelling means for impelling said single movable means in a plurality of directions, and a plurality of links for actuating said impelling means.

13. In a speed changing mechanism, planetary speed changing means, pivotal means for controlling said planetary speed changing means, actuating means for said pivotal means, said actuating means including in combination a single movable means, a plurality of yielding means for actuating said single movable means in a plurality of directions, impelling means for impelling said plurality of yielding means in a plurality of directions, and linkage connected to said impelling means for actuating said impelling means, said linkage disposed on a plurality of sides of a line falling within the path of movement of said impelling means, said line corresponding with the direction of said movement.

14. A speed changing mechanism including in combination a plurality of shafts, means including in combination planetary gear mechanism for connecting some of said shafts, a plurality of over-running clutch means cooperating with some of said shafts, said clutch means simultaneously permitting different speeds of some of said shafts, pivotal controlling means for said planetary gear mechanism, actuating means for said pivotal controlling means, said actuating means including in combination a single movable means, yielding means for actuating said single movable means, impelling means for impelling said yielding means, and pivotal means for actuating said impelling means.

15. In a speed changing mechanism, speed changing means, control means therefor, said control means including in combination a single movable means, actuating means for said single movable means, said actuating means including in combination linkage connected to said single movable means for actuating said single movable means, lever means connected to said linkage for actuating said linkage, linkage connected to said lever means for actuating said lever means, and capsular means responsive to atmospheric pressure for actuating said last above mentioned linkage.

16. In a speed changing mechanism, speed changing means, pivotal means for controlling said speed changing means, actuating means for said pivotal means, said actuating means including in combination a single movable means, a plurality of yielding means for actuating said single movable means in a plurality of directions, impelling means for impelling said plurality of yielding means in a plurality of directions, and pivotal means for actuating said impelling means, said pivotal means disposed on a plurality of sides of a line falling within the path of movement of said yielding means, said line corresponding with the direction of said movement.

17. In a speed changing mechanism, speed changing means, pivotal means for controlling said speed changing means, actuating means for said pivotal means, said actuating means including in combination a single movable means, a plurality of yielding means for actuating said single movable means in a plurality of directions, impelling means for impelling said plurality of yielding means in a plurality of directions, and a plurality of links for actuating said impelling means in a plurality of directions, said plurality of links disposed on a plurality of sides of a line falling within the path of movement of said plurality of yielding means, said line corresponding with the direction of said movement.

18. In a speed changing mechanism, speed changing means, rigid lever means for controlling said speed changing means, actuating means for said rigid lever means, said actuating means including in combination a single movable means, a plurality of yielding means for actuating said single movable means in a plurality of directions, said plurality of yielding means disposed approximately in axial alignment, impelling means for impelling said plurality of yielding means in a plurality of directions, and linkage connected to said impelling means for actuating said impelling means in a plurality of directions, said linkage disposed on a plurality of sides of a line falling within the path of movement of said impelling means, said line corresponding with the direction of said movement.

19. In a speed changing mechanism, speed changing means, said speed changing means including in combination a carrier member, planet gears thereon, and an orbit gear, a plurality of pivotal means for controlling said speed changing means, actuating means for said plurality of pivotal means, said actuating means including in combination a single movable means, a plurality of yielding means for actuating said single movable means in a plurality of directions, impelling means for said plurality of yielding means, linkage for actuating said impelling means, said linkage disposed on a plurality of sides of a line falling within the path of movement of said impelling means, said line corresponding with direction of said movement, detent means for holding said movable means in a plurality of positions, and speed controlled means for actuating said linkage.

20. In a speed changing mechanism, speed changing means, said speed changing means including in combination a carrier means, planet gears thereon, and an orbit gear, braking means for said orbit gear, pivotal means for actuating said braking means, cylindrical operating means for said pivotal means, operating means for said cylindrical operating means, said operating means including in combination a single movable means, a plurality of yielding means for actuating said single movable means in a plurality of directions, impelling means for said plurality of yielding means, and actuating means for said impelling means, said last above mentioned actuating means including in combination a plurality of pivotal means disposed on a plurality of sides of a line falling within the path of movement of said impelling means, said line corresponding with the direction of said movement.

21. In a speed changing mechanism, speed changing means, said speed changing means including in combination planetary gear mechanism having a carrier means, planet gears thereon, and a drum, braking means for said drum, lever means for actuating said braking means, operating means for said lever means, said operating means including in combination a single movable means, a plurality of yielding means for actuating said single movable means in a plurality of directions, impelling means for said plurality of yielding means, and actuating means for said impelling means, said last above mentioned actuating means including in combination a plurality of pivotal means disposed on a plurality of sides of a line falling within the path of movement of said impelling means, said line corresponding with the direction of said movement.

22. In a speed changing mechanism, speed changing means, said speed changing means including in combination planetary gear mechanism having a drum, braking means for said drum, lever means for actuating said drum, operating means for said lever means, said operating means including in combination a single movable means, a plurality of yielding means for actuating said single movable means in a plurality of directions, impelling means for said plurality of yielding means, and actuating means for said impelling means, said last above mentioned actuating means including in combination a plurality of pivotal means disposed on a plurality of sides of a line falling within the path of movement of said impelling means, said line corresponding with the direction of said movement.

23. In a speed changing mechanism, speed changing means including in combination a carrier means, planet gears thereon, and an orbit gear, pivotal control means for said speed changing means, actuating means for said pivotal control means, said actuating means including in combination a single movable means, a plurality of yielding means for actuating said single movable means in a plurality of directions, detent means for opposing the movement of said single movable means at a plurality of positions and additional detent means for opposing the movement of said single movable means at a plurality of positions.

24. In a speed changing mechanism, a plurality of speed changing means, said speed changing means including in combination carrier means, planetary gearing on said carrier means, and an orbit gear, and control means for said speed changing means, said control means including in combination hermetically sealed capsular means responsive to atmospheric pressure.

25. In a speed changing mechanism, a plurality of speed changing means, said speed changing means including in combination carrier means, planetary gearing on said carrier means, and an orbit gear, and control means for said orbit gear, said control means including in combination hermetically sealed capsular means adapted to expand and contract in overall size in response to changes in atmospheric pressure.

CLIVE W. LANPHERE.